United States Patent
Deliso et al.

(10) Patent No.: US 6,263,706 B1
(45) Date of Patent: Jul. 24, 2001

(54) METHOD OF CONTROLLING FLUORINE DOPING IN SOOT PREFORMS

(76) Inventors: Evelyn M. Deliso, 248 Chemung St., Corning, NY (US) 14830; Claud E. Lacy, 5 Dogwood La., Painted Post, NY (US) 14870; Deborah L. Marlatt, 898 County Rte. 85, Addison, NY (US) 14801

( * ) Notice: Subject to any disclaimer, the term of this patent is extended or adjusted under 35 U.S.C. 154(b) by 0 days.

(21) Appl. No.: 09/280,464

(22) Filed: Mar. 30, 1999

(51) Int. Cl.$^7$ ................................................. C03B 37/018
(52) U.S. Cl. ................................................. 65/397; 65/398
(58) Field of Search ................................ 65/397, 398

(56) References Cited

U.S. PATENT DOCUMENTS 3,981,707 * 9/1976 Araujo et al. .
4,693,738   9/1987 Hoshikawa et al. ................ 65/3.11
5,210,816   5/1993 Iino et al. ............................ 385/142
5,799,123 * 8/1998 Oyobe et al. .

FOREIGN PATENT DOCUMENTS 0 201 937 B1  11/1986 (EP) .
   215603  *  3/1987 (EP) .
   311080  *  4/1989 (EP) .

* cited by examiner

Primary Examiner—Sean Vincent
(74) Attorney, Agent, or Firm—Robert L. Carlson

(57) ABSTRACT

A method for controlling the refractive index achieved using a fluorine dopant gas, wherein $CF_4$ is employed as the dopant gas, and the soot preform is doped using the $CF_4$ for a time and temperature sufficient to result in a decrease in fluorine dopant nearest the surface which is in contact with the $CF_4$ gas.

48 Claims, 8 Drawing Sheets

METHOD OF CONTROLLING FLUORINE DOPING IN SOOT PREFORMS

BACKGROUND OF THE INVENTION

1. Field of the Invention

The present invention relates to a method of making preforms for optical waveguides, more particularly to a method for controlling the amount of fluorine doping at various locations across the profile of such preforms.

2. Technical Background

Optical waveguides such as optical fiber are typically made using materials of different refractive indices for the core and clad regions. The core region, wherein the majority of light is transmitted, consists of a region of higher refractive index than the clad region. In silica based optical fibers, this refractive index difference is obtained by adding various dopants. Fluorine is a commonly employed dopant for lowering the refractive index, and germania is a commonly employed dopant for raising the refractive index.

To fluorine dope a silica soot preform, such as can be made from an OVD, MCVD, VAD or other vapor deposition process, a fluorine containing gas such as $SiF_4$ or $CF_4$ can be flowed over the surface of the soot preform. The fluorine containing gas then diffuses into the soot preform and the fluorine reacts with the soot, thereby doping the silica soot with fluorine. In the past, fluorine incorporated into the soot has been highest near the preform surface which is in contact with the flow of fluorine containing gas.

Methods have been proposed to achieve a more uniform level of fluorine doping or a higher fluorine doping amount on a surface of the soot preform which is opposite the flow of fluorine dopant gas. For example, U.S. Pat. No. 5,210,816 discloses achieving this result by changing the soot density prior to the consolidation step. Basically, this method works on the principle that the lower the soot density, the higher the fluorine dopant level will be. It would be desirable to develop alternative methods which do not require deposition of various layers having different densities.

SUMMARY OF THE INVENTION

One aspect of the present invention relates to a method for incorporating fluorine internally into a soot preform by exposing the soot preform to a fluorine containing gas for a time and at a temperature which is sufficient to result in a lowering of the fluorine content along the surface of the soot preform which is in contact with the fluorine containing gas. Most preferably, the fluorine containing gas is an organic fluorine containing gas. The methods of the present invention can be used to dope such soot preforms in this manner without having to change the soot density and without having to turn off the fluorine gas during sintering to allow fluorine to escape. The doping methods of the present invention can be employed to form various fluorine doping profiles which have heretofore been difficult or impossible to attain using previous soot preform doping techniques.

The method is particularly useful for doping preforms which are used to form optical fiber and other waveguides. Such preforms are typically formed by chemically reacting at least some of the constituents of a moving stream of gas mixture comprised of at least one glass forming precursor compound and an oxidizing medium, the reaction resulting in the formation of a glassy silica based reaction product. This reaction product is typically employed to form a soot body (i.e., the preform) by depositing at least a portion of the reaction products onto a substrate. The resulting soot bodies are then doped in accordance with the invention.

In one preferred embodiment, the soot body is deposited onto a mandrel and the mandrel is removed to form a cylindrical soot body having a center line hole therethrough. Center line gases, such as helium, can then be flowed down the hole to facilitate the removal of fluorine dopant from the soot preform in the region adjacent to the hole, and thus increase the relative fluorine concentration within the soot body. By flowing a gas such as helium along the centerline hole of the soot preform, and a fluorine containing gas along the outside of the soot preform, the location of the maximum fluorine dopant concentration can be made to be between the outside surface and the centerline surface of the preform.

Alternatively, a glass rod can be inserted into the soot preform prior to the doping step, and the doping step then carried out. The glass rod may or may not be doped with various core layers of index increasing dopants.

Alternatively, the mandrel can be in the form of a glass rod which may or may not be doped with various dopants such as $GeO_2$, and the soot body deposited onto the glass rod. In this way, refractive index profiles could be achieved which have a germania updoped central portion surrounded by a fluorine doped annular ring section.

As mentioned above, in the present invention, a dopant gas is employed which, after a sufficient time of exposure to the dopant gas, results in a lowering of the fluorine content at the glass surface which is nearest the flow of dopant gas. Preferred gases for use in the present invention include fluorocarbon gases such as $CF_4$, $C_2F_6$, and $C_3F_8$. However, the invention is not necessarily limited to such gases, and it is believed that other gases, such as, for example, $SF_6$, would work as well. A particularly preferred gas which can be used in the invention is $CF_4$.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
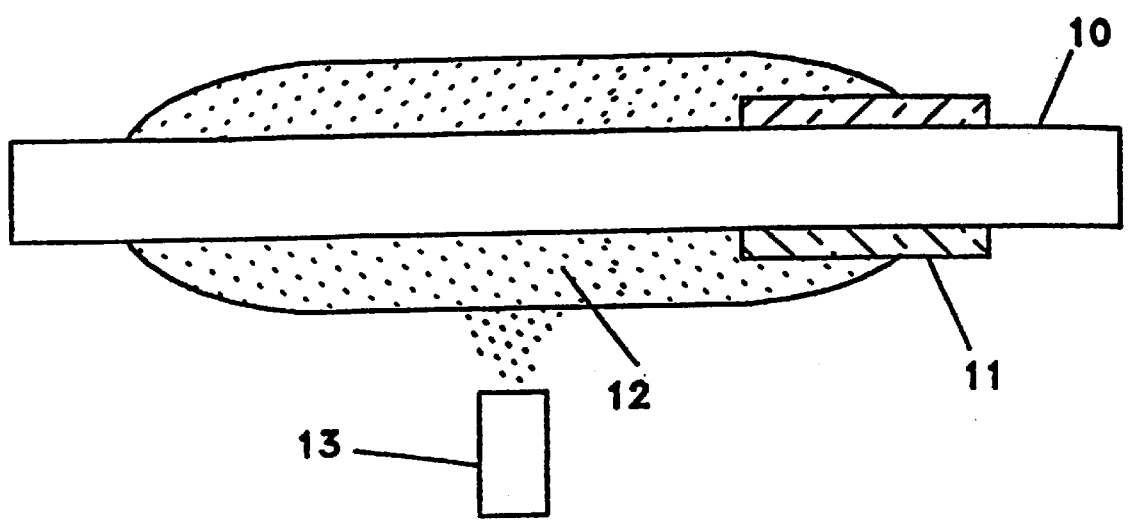
FIG. 1 illustrates a method for depositing soot onto a substrate.
Figure 2:
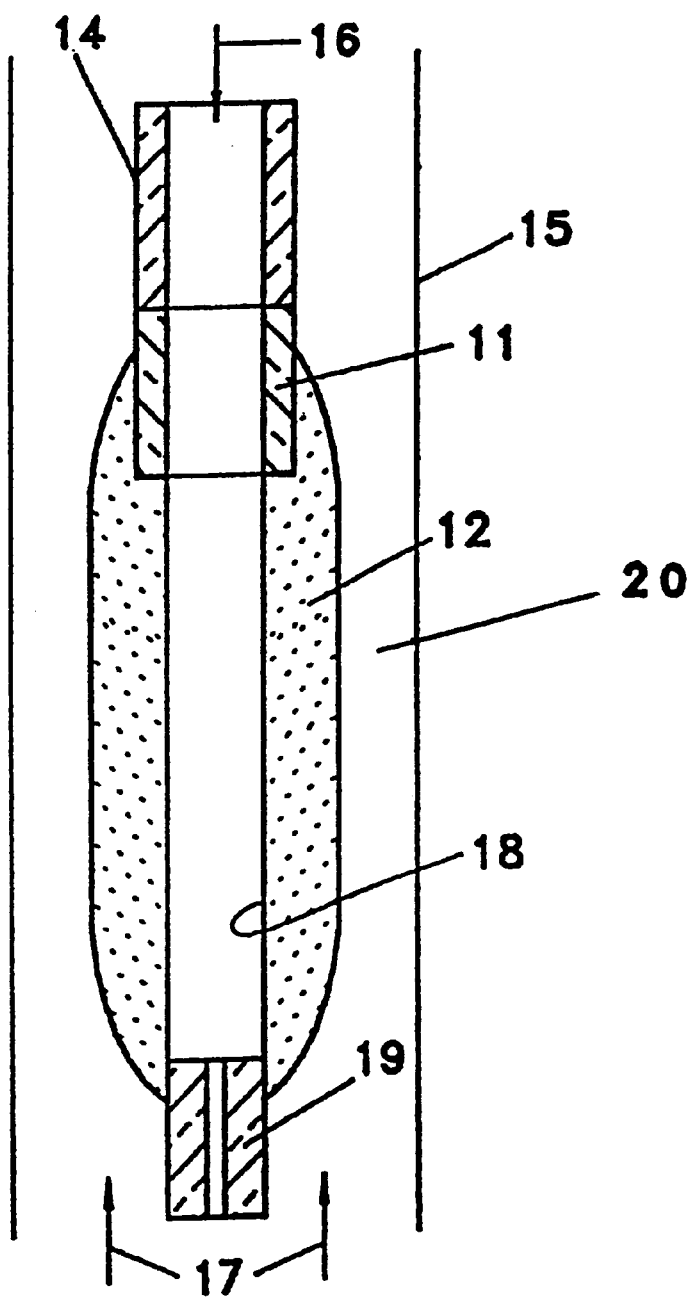
FIG. 2 illustrates a method for doping a soot structure in accordance with the invention.

FIGS. 1 and 2 illustrate the outside vapor deposition (OVD) method of making a fluorine-doped glass soot body. Mandrel 10 is inserted through tubular handle 11. While mandrel 10 rotates, it also undergoes translational motion with respect to soot generating burner 13, whereby a porous glass soot preform 12 is built up on the mandrel. Mandrel 10 can be a removable substrate, so that it can be removed after formation of the soot body 12 which is built up on mandrel 10, to thereby form a cylindrical soot body having a centerline hole 18. Alternatively, mandrel 10 could be in the form of a glass rod which will become part of the optical fiber preform. In this case, the glass rod would not be removed from the soot body 12.

Prior to the soot body being doped with fluorine, it is preferably chemically dried. Handle 14 is fused to handle 11, and preform 12 is suspended in consolidation furnace 15 by that handle. While assembly 20 is heated in consolidation furnace 15, a drying gas flows upwardly through the furnace (arrows 17). The drying gas conventionally comprises a mixture of chlorine and an inert gas such as helium. The chlorine acts as a hot chemical cleaning and drying agent. Preferably, at least a portion of this hot chlorine treatment step takes place while the temperature is below the sintering temperature of soot coating 12. The chlorine cleaning step is more effective at high temperatures. It is preferred that the temperature of the cleaning step be at least 1000° C., since at lower temperatures, the duration of the step would be sufficiently long that the step would be undesirable for commercial purposes. Obviously, lower temperatures could be employed if processing time were not a concern. The flow of chlorine can be discontinued after the desired water content has been achieved and before the porous preform sinters.

The soot preform is then doped with fluorine in accordance with the invention, followed by sintering of the soot into transparent glass. As illustrated in FIG. 2, the fluorine doping step in accordance with the present invention is carried out in a furnace 15, which may be, for example, a consolidation furnace. The fluorine-containing gas flows through furnace muffle 15, as indicated by arrows 17, and preferably contains a diluent gas such as helium. An optional centerflow gas 16 may be employed in several embodiments, which consists of helium. The end of the porous preform may optionally include a capillary tube 19 to prevent the muffle gases 17 from entering the preform aperture, if desired. Sintering is also preferably performed in an atmosphere that includes a fluorine-containing gas such as $SiF_4$, $CF_4$, $C_2F_6$, or the like.

The doping is preferably carried out at temperatures in between the drying temperatures (typically about 1000° C.) and sintering temperatures (typically about 1500° C.). The doping part of the process can be performed either under isothermal conditions or under varied temperatures. For the examples shown, the doping is under isothermal conditions at 1225° C. Tube 19 is severed from the resultant fluorine-doped tube. The resultant fluorine-doped tube, which at this point has been consolidated into glass, can then be stretched or redrawn to decrease the inside diameter to the desired size. If the tube is stretched, it can then be cut to lengths suitable for the deposition of additional soot thereon.

During the doping step, a fluorine containing gas 17 is flowed along an outside surface of the preform. Typically this gas is only a fraction of the overall gas flow, e.g., 1–30% by volume, and more preferably 1–15% by volume. Most preferably, the gas is $CF_4$ an amount which is 1–15% by volume of the total gas flowed through along the outside surface of the preform. While virtually any other inert gas might be employed to make up the remainder of the gas being flowed, the preferred carrier gas is helium. If the preform has an open centerline such as in some OVD core blanks, then dopant gas can be flowed down the centerline as well, as indicated by arrow 16. Any of the fluorocarbon gases which are known in the art can be used in the present invention, the most preferred dopant gas being $CF_4$.

More preferably, the fluorine doping operation is carried out for a time which is sufficient to result in the fluorine content of the resulting glass becoming depleted at the outer surface of the soot body, which is in contact with the fluorine gas, while the fluorine content increases toward the center of the blank as the doping time increases. Such non-uniformity of fluorine doping can be achieved using $CF_4$ to make refractive index profiles which have heretofore been extremely difficult to achieve using conventional doping methods.

Because fluorine lowers the refractive index of glass, the refractive profile of the resultant doped glass can be used as a measure of how much fluorine was incorporated during the fluorine doping operation.

Figure 3A:
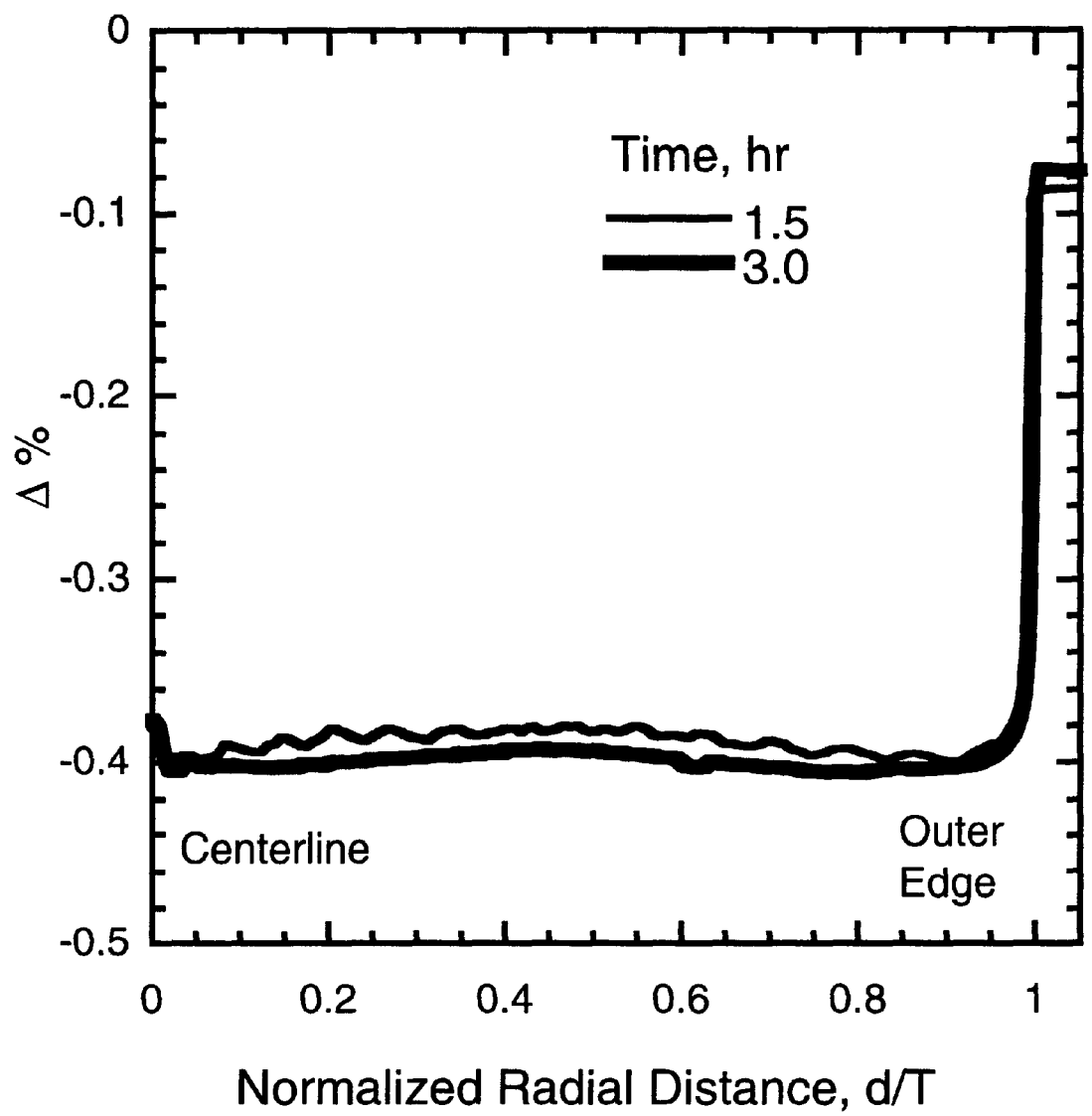
FIGS. 3a and 3b compare the effects of $SiF_4$ with $CF_4$ as dopant gases.
Figure 3B:
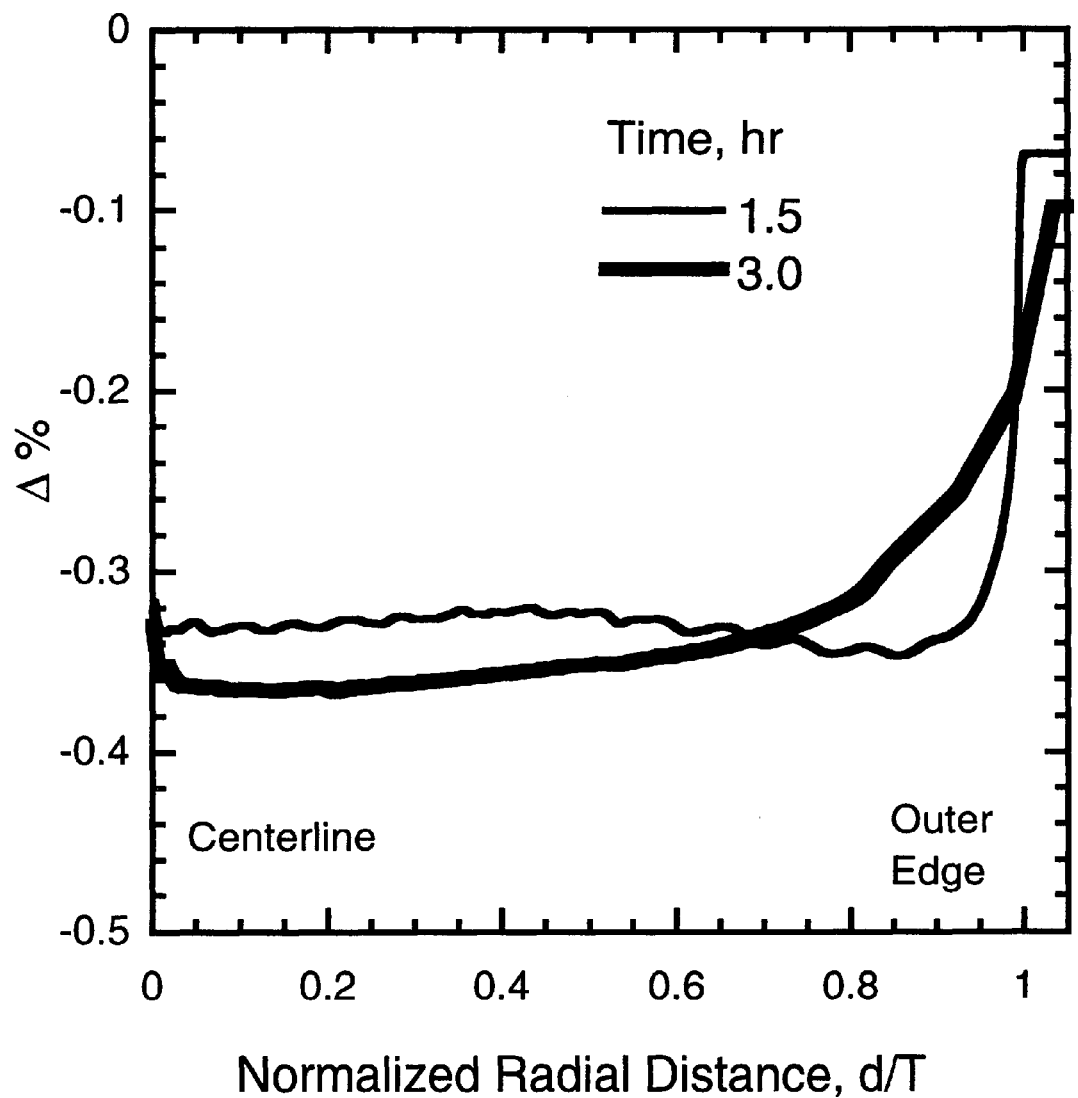
Figure 4:
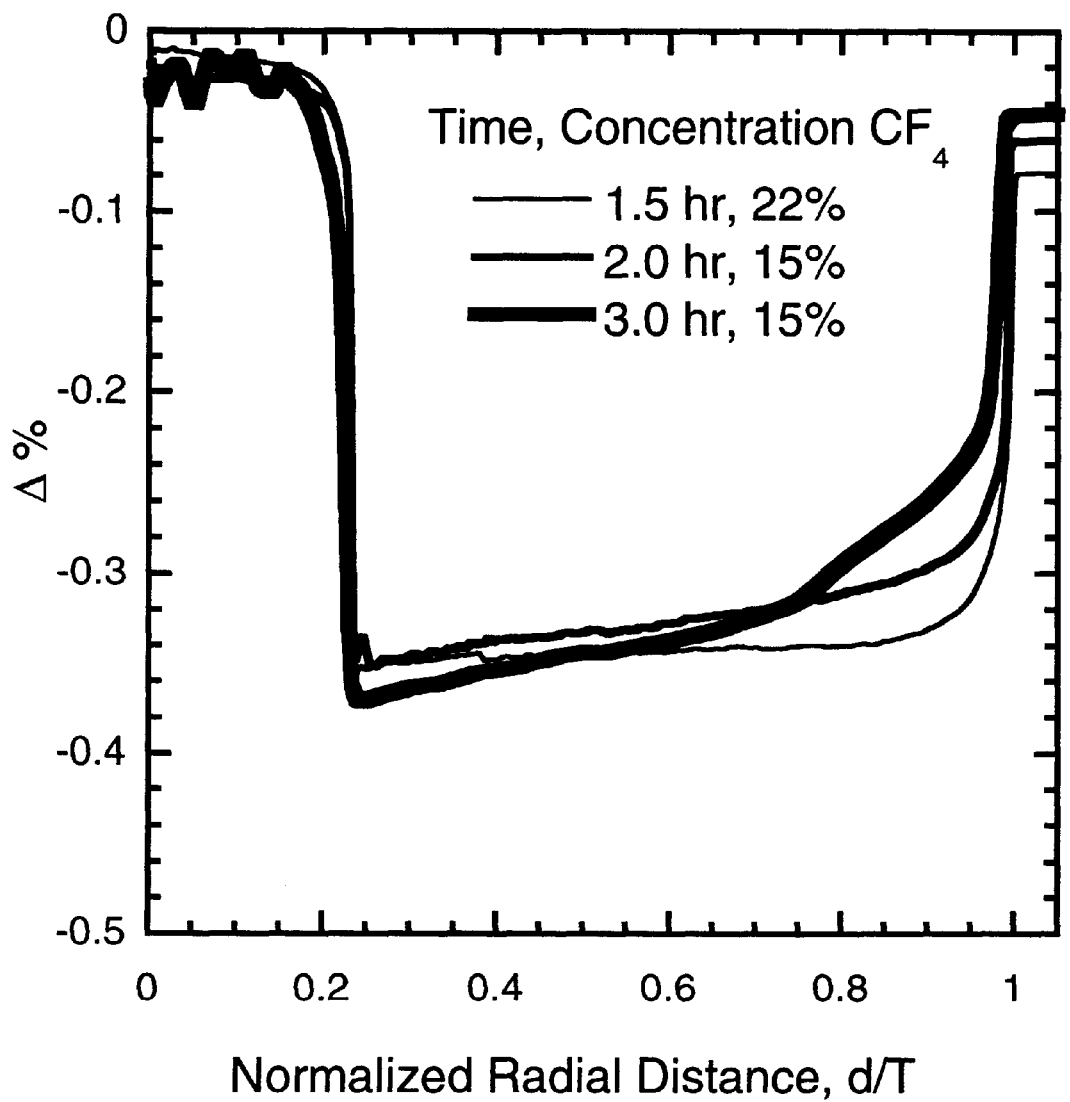
FIG. 4 illustrates the variation and fluorine dopant concentration which is achieved by varying doping time utilizing $CF_4$ gas on silica soot deposited over a glass cane.

FIGS. 3–5 illustrate the advantageous effects of various fluorine doping techniques in accordance with the invention. In all of FIGS. 3–5, the normalized radial distance across the thickness of the cylindrical soot preforms is shown, with zero being along the centerline hole, and the outer edge at about 1. $\Delta\%$ is an expression of the refractive index relative to silica. $\Delta\% = 100 \times (n_1 - n_c)/n_c$, where $n_1$ is the maximum refractive index of the material at a given point and $n_c$, which is usually taken to be the maximum index of the clad layer. In the present invention the preferred cladding layer is silica.

FIGS. 3A and 3B show the difference in resultant refractive index profiles when silica soot core blanks were doped using $SiF_4$ and $CF_4$, respectively for 1.5 and 3 hours. The cylindrical soot preforms were formed using the OVD deposition process described above in FIG. 1. After the bait rod or mandrel 10 was removed, the resultant cylindrical soot preforms were chemically dried as described above. Then, while the soot preform was maintained within a furnace which was heated to 1225° C., the respective fluorine gases were flowed only along the outside of the soot preform, with no gas flowing along the open centerline. After the doping step, the preforms were consolidated as described hereinabove, during which time the flow of dopant gases was left on as in the doping step. After consolidation the refractive index profiles were measured. In the case where $SiF_4$ was employed as the dopant gas, illustrated in FIG. 3a, the refractive index profiles are relatively uniform across the periphery of the preform, regardless of the doping time employed. Thus, with some fluorine dopant gases, in this case $SiF_4$, as long as sufficient time is allowed for the fluorine doping operation, the amount of fluorine added to the glass from the dopant gas (e.g. $SiF_4$) can be made to reach an equilibrium and be constant across the preform, assuming a constant soot density. However, as illustrated in FIG. 3B, when $CF_4$ is the doping gas, at longer doping times,. e.g. longer than 1.5 hours, or as in this case 3 hours, fluorine becomes depleted near the outer surface which is in contact with the $CF_4$, thereby creating a fluorine dopant profile which is highest near the centerline hole, i.e., the surface which is not in contact with the $CF_4$ dopant gas.

As illustrated in FIG. 4, this depletion effect is even more pronounced when doping an overclad soot preform having a glass cane in the center of the preform and thus no open centerline. FIG. 4 illustrates data for three different cases where $CF_4$ was used to dope such an overclad soot preform. In each case, a soot body was formed using the OVD deposition process illustrated in FIG. 1. A pure undoped $SiO_2$ glass rod was employed as the substrate 10 for deposition of soot 12. In FIG. 4, the normalized radius of the silica glass rod is about 0.21. The resultant glass rod which was overclad with the soot (i.e., an overclad soot preform) was then chemically dried as describe above. Then, while maintaining the soot body within a furnace maintained at 1225° C., $CF_4$ dopant gas was flowed along the outside of the overclad soot portion of the preform. After the doping steps, the resultant preforms were consolidated as described herein above, after which their refractive index profiles were measured. The resultant index of refraction profile illustrated in FIG. 4 shows that, by increasing doping time, one can produce a fluorine dopant induced refractive index profile which varies across the preform increasing from the glass cane region to the outer edge of the overclad soot. Thus, in each of the cases illustrated in FIG. 4, the maximum index depression is made to be along the glass cane by creating a fluorine dopant profile which is lowest along the surface which is exposed to dopant gas. Consequently, if the glass cane were doped with a refractive index increasing dopant, the index profile could be made to change very abruptly from a region of high relative refractive index to a region of low refractive index.

Figure 5A:
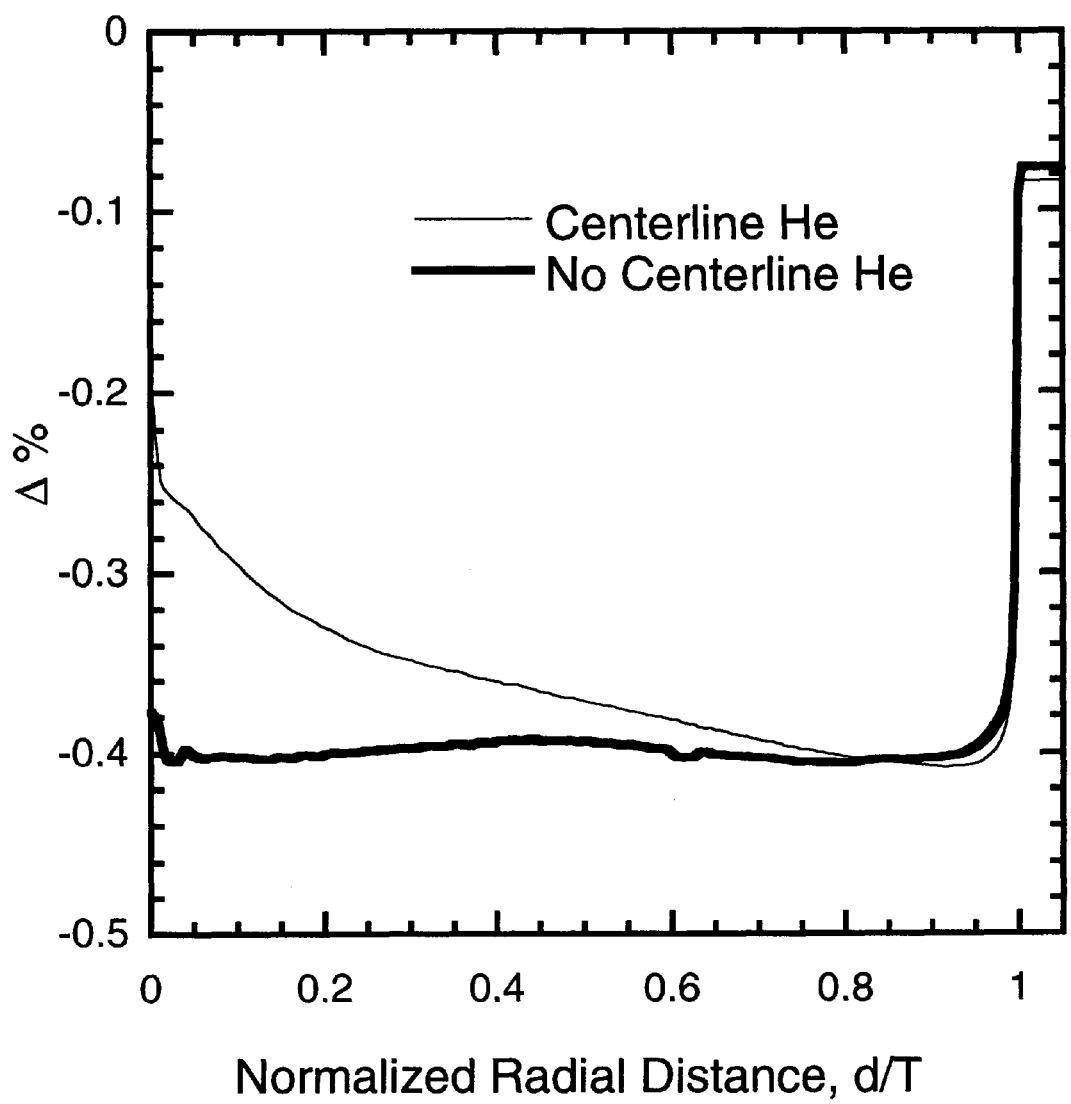
FIGS. 5a and 5b compare the doping effect achieved using $SiF_4$ and $CF_4$ with and without centerline helium gas.
Figure 5B:
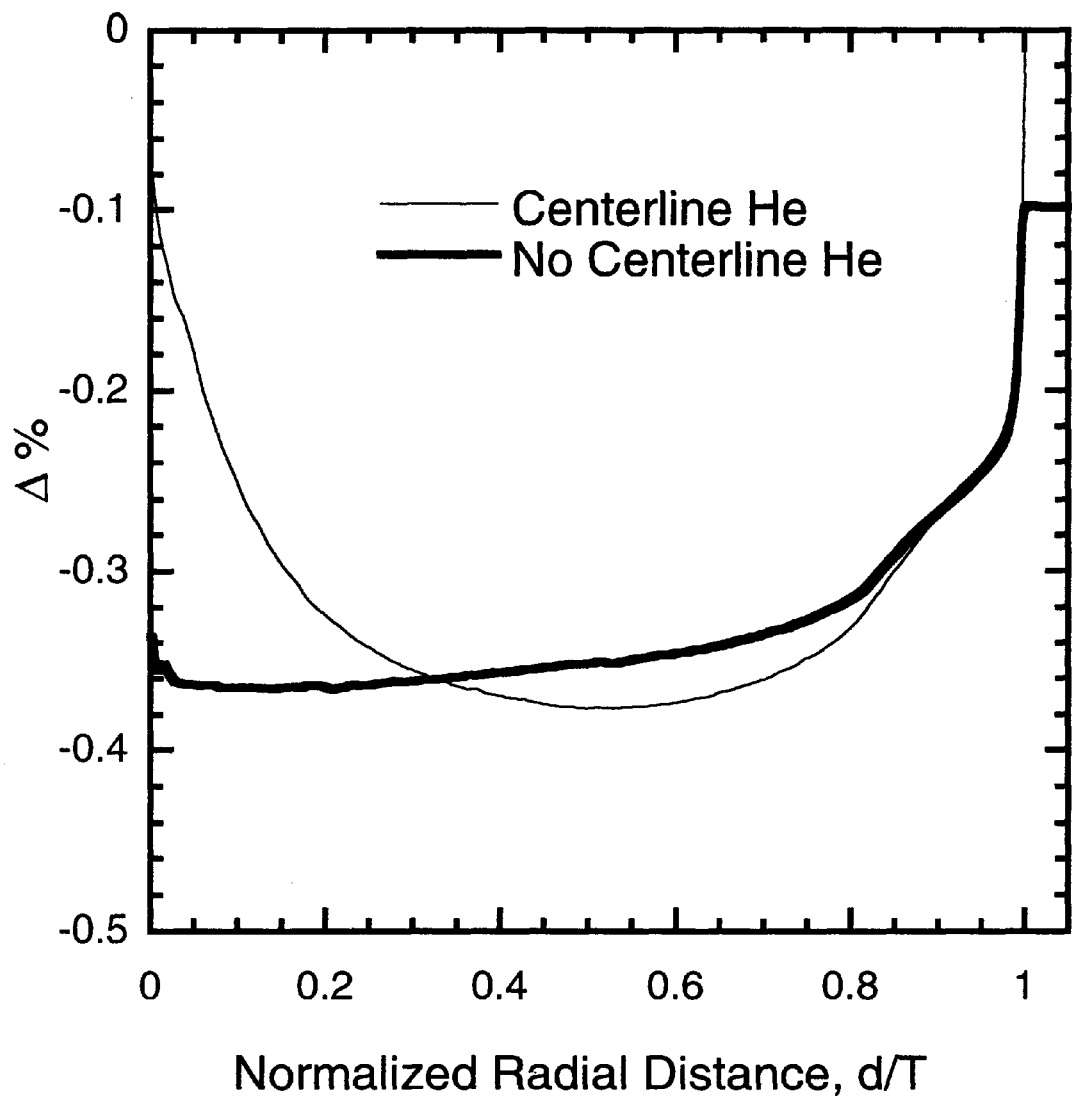

Alternatively, using the techniques of the present invention, the maximum index depression (and thus maximum fluorine content) can be made to be located at a point between the centerline and the outer edge of the soot region of the preform being doped. In the examples illustrated in FIGS. 5A and 5B, tube shaped soot preforms were formed by first depositing silica soot 12 onto a removable mandrel 10 and then removing the mandrel 10, as discussed above with respect to FIG. 1. Prior to the doping step, the soot preforms were chemically dried with a flow of chlorine containing gas, as described above. The resultant cylindrical soot preforms were then doped by flowing fluorine gas along the outer edge of the soot preform, both with and without a flow of helium gas along the centerline hole of the soot preform. In the cases where helium gas was flowed through the centerline, the concentration of the helium gas was one hundred percent and at all times, no fluorine gas was flowed along the centerline hole. After the doping steps, the resultant preforms were consolidated as described herein above, after which their refractive index profiles were measured. FIGS. 5A and 5B illustrate the resultant refractive index profiles, wherein $SiF_4$ (FIG. 5A) and $CF_4$ (FIG. 5B) respectively, were used as the dopant gas flowed along the outer edge of the soot preform. Both FIGS. 5A and 5B compare the effect that these two dopant gases have on the soot preform in situations where helium gas is flowed along the centerline, compared to situations where helium is not flowed along the centerline. The inner surface of the soot preform is at zero on the radial distance axis, and the normalized radius of the outside surface of the soot cylinder is about 1. As can be seen in FIG. 5A, when $SiF_4$ is employed, and no centerline helium gas is employed, the refractive index can be made to be essentially constant across the profile of the preform. When $SiF_4$ is employed on the outer edge and helium flowed through the centerline of the preform, the helium drastically lowers the fluorine dopant concentration nearest the centerline hole, creating an index of refraction profile which decreases relatively uniformly toward the outer edge of the preforms. As illustrated in FIG. 5B, when $CF_4$ gas is flowed along the outer edge of the preform, and helium flowed along the centerline, the index of refraction can be made to be nearly parabolic with a minimum index of refraction located at the midpoint between the centerline and the outer radius of the preform. In one preferred embodiment of the invention, this technique is employed, so that the point of maximum fluorine doping is located midway between the inner and outer surfaces of the soot preform, i .e., so that $0.2<d/t<0.8$, more preferably, $0.3<d/t<0.7$, and most preferably, d/t is equal to about 0.5, where d=the distance measured from the inner edge of the cylindrical preform t o the point of maximum fluorine doping, and T=the thickness of the cylindrical preform being doped. Thus, the fluorine content can be made to be a maximum at a point which is in between the inside and outside surfaces of the cylindrical soot preform being doped.

While not wishing to be bound by theory, it is believed that one possible explanation for this result is that the fluorine-doped silica tends to form $SiF_4$ when $CF_4$ is used as the dopant gas resulting in etching of the blank as given by the following reaction:

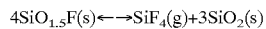

This etching theory is somewhat supported by the fact that preforms doped with $CF_4$ lose several percent of their weight during consolidation while those doped with $SiF_4$ gain weight. Near the outer and inner surface of the preform the $SiF_4$ concentration is nearly zero as the gas flow is believed to take away any $SiF_4$ being formed. Also, the $CF_4$ may be diluted by the flow of He along the centerline. The combination of these effects results in less fluorine doping at the outer surface as doping is competing with etching. Internally, the $SiF_4$ concentration increases with increasing distance from the boundary. As the $SiF_4$ concentration increases, then less etching occurs as the reaction is pushed to the left-hand side and thus more fluorine is doped in the soot.

This invention thus enables the formation of fluorine doping profiles in which the fluorine dopant amount is actually lower along a surface which is in contact with the fluorine dopant gas than at locations which are further away from this surface, e.g., in the central portion of the soot preform. This effect is preferably achieved by using $CF_4$ dopant gas for a time and at a temperature which is sufficient to result in a decrease in the amount of fluorine dopant along the surface which is in contact with the $CF_4$. Because other fluorine dopants such as $C_2F_6$ and $C_3F_8$ can form $CF_4$ insitu in the consolidation process, the invention is not necessarily limited to $CF_4$ as the dopant gas, and it is believed that other fluorocarbon gases, such as $C_2F_6$ and $C_3F_8$, could be employed as well. The fluorocarbon gas, which preferably is $CF_4$, is preferably employed in a range of 1 to 15 percent by volume, the remainder being one or more inert carrier gases, such as helium, argon, nitrogen, and mixtures thereof. These dopant gases are preferably employed for a time and temperature which is sufficient to result in the desired fluorine dopant profile. In a preferred embodiment used to obtain a parabolic fluorine dopant profile, with a maximum fluorine dopant level in the middle of the soot body, the temperature is preferably between 1150 and 1300° C., more preferably between 1200 and 1250° C. and the doping time is at least one hour, more preferably greater than 1.5 hours, and most preferably greater than 2 hours, with $CF_4$ gas flowed along the outer edge of cylindrical soot preform, and helium gas flowed along the centerline. The inert carrier gas preferably consists of at least 50% helium, more preferably more than 75% helium, and most preferably about 100% helium, the remainder being made up of a carrier gas such as argon, nitrogen, and mixtures thereof.

Figure 6:
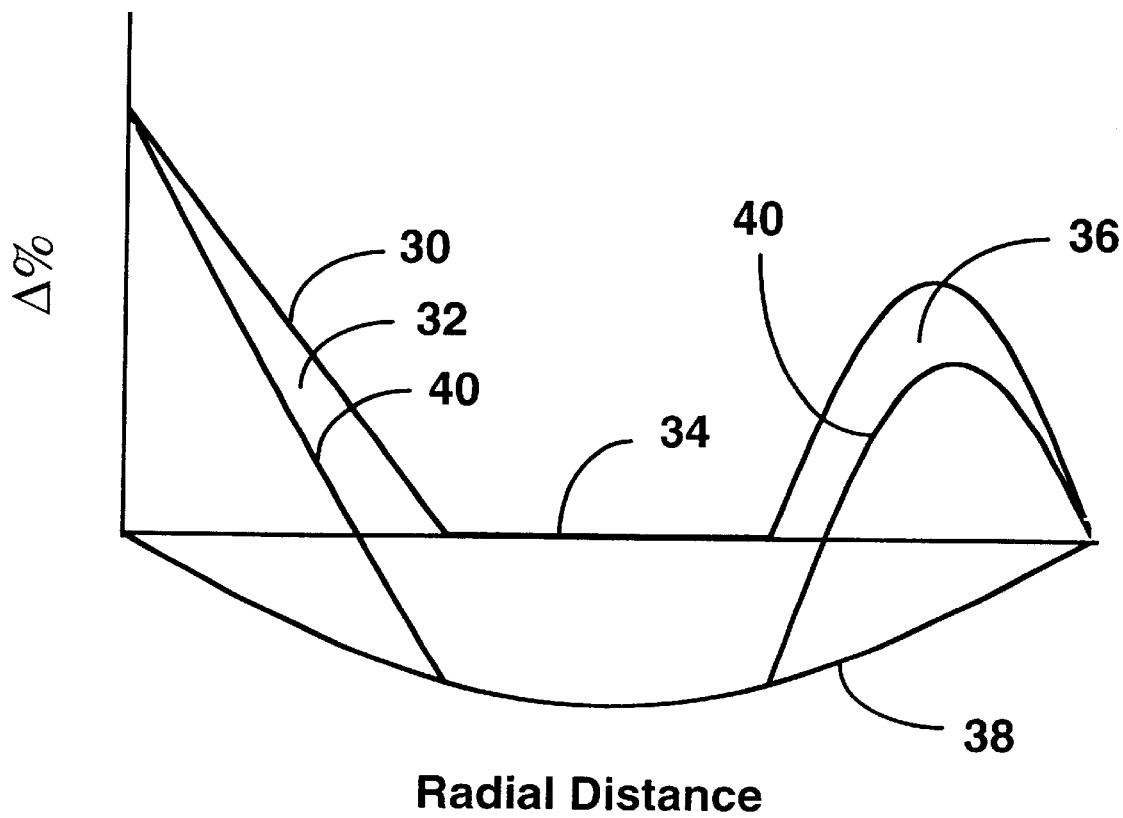
FIG. 6 illustrates a method of making a core for an optical fiber using the methods of the present invention, the core consisting of two updoped regions separated by a region of depressed index of refraction.

Utilizing the techniques illustrated by FIG. 4 and FIGS. 5A and 5B, a variety of index refraction profiles can be formed using the techniques of the present invention. For example, as illustrated in FIG. 6, a soot preform can be deposited onto a mandrel which already has various refractive index increasing dopants (e.g., $GeO_2$) incorporated therein. Curve 30 in FIG. 6 illustrates the refractive index profile of a germania-doped silica soot preform, which includes a first updoped region 32 located along the centerline, followed by a region of undoped material 34 (i.e., silica), followed by an annular updoped ring region 36. Such a soot preform can be produced, for example, by laying down layers of soot via CVD having varying amounts of $GeO_2$ dopant in the $SiO_2$ soot, to thereby form the three regions 32, 34, and 36. While a preferred method for forming the soot preform is the OVD method illustrated in FIG. 1, other methods could also be employed.

By then flowing $CF_4$ gas along the outside of the resultant soot preform, and helium and chlorine gas along the centerline hole region, a fluorine doping effect will be achieved across the thickness of the soot preform which is similar to that illustrated in FIG. 5b, i.e., the maximum fluorine doping can be made to occur at a point which is midpoint between the centerline hole and the outside of the annular region 36, as illustrated by curve 38 in FIG. 6, which represents the refractive index contribution due to fluorine. The resultant total refractive index profile achieved when the fluorine doped soot preform is consolidated into a glass preform, taking into account both the effect of the germania and the fluorine dopants, will consequently approximate the curve 40. Consequently, using this technique, a region of depressed index of refraction can be incorporated between two increased regions of index refraction without having to deposit any of the fluorine dopant during the soot deposition step. Also, this minimizes the amount of dopant concentration overlap in regions of high $GeO_2$, i.e., along the inner and outer surfaces of the cylindrical soot preform. Consequently, less $GeO_2$ is needed in these areas to counteract the negative refractive index doping effect of the fluorine. Such a profile can also be achieved using a single soot deposition step to deposit a multi index component soot preform (in this case a cylindrical soot preform having updoped regions 30 and 36, separated by undoped region 34), followed by a single fluorine doping step. In addition, alternative dopants besides $GeO_2$, such as, for example, $Al_2O_3$, $P_2O_5$, $TiO_2$, and $Ta_2O_5$ could be employed as the index refraction increasing dopant.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A method of making a fluorine-doped optical fiber preform comprising of steps of:
   chemically reacting at least some of the constituents of a moving stream of gas mixture comprising at least one glass-forming precursor compound and an oxidizing medium, the reaction resulting in the formation of a glassy silica-based reaction product,
   forming a body by depositing at least a part of the reaction products on a substrate, and
   doping the body with fluorine by contacting a surface of the body with a fluorine containing gas for a time and at a temperature which is sufficiently to result in a fluorine content at or near said surface which is lower than the fluorine content internal to said body and which is lower than the fluorine content at or near said surface when doped at said temperature but for a shorter time.

2. The method of claim 1, wherein said fluorine containing gas is an organic fluorine containing gas or $SF_6$.

3. The method of claim 2, wherein the body is deposited onto a mandrel, and the mandrel is removed to form a cylindrical soot body having a centerline hole therethrough.

4. The method of claim 3, wherein a gas is flowed down the centerline hole during said doping step.

5. The method of claim 4, wherein the gas flowed down the centerline hole is helium.

6. The method of claim 2, wherein the organic fluorine containing gas is selected from the group consisting of $CF_4$, $C_2F_6$, and $C_3F_8$.

7. The method of claim 6, wherein the substrate is a glass rod and the doping step is carried out for a time sufficient to result in a fluorine doping concentration which increases with distance from the outer edge of the soot preform material.

8. The method of claim 1, wherein the fluorine containing gas is selected from the group consisting of $CF_4$, $C_2F_6$, and $C_3F_8$.

9. The method of claim 3, wherein said method further comprises, subsequent to said doping step, inserting a second body which is comprised of silica based glassy material, into said hole.

10. The method of claim 9, wherein said second body comprises a consolidated glass body.

11. The method of claim 10, wherein said second body comprises at least a first core segment comprising a refractive index increasing dopant.

12. The method of claim 11, wherein said refractive index increasing dopant is selected from the group consisting of $GeO_2$, $Al_2O_3$, $P_2O_5$, $TiO_2$ and $Ta_2O_5$.

13. The method of claim 11, wherein the fluorine containing gas is selected from the group consisting of $CF_4$, $C_2F_6$, and $C_3F_8$.

14. The method of claim 2, wherein said substrate is a glass rod and the doping step is carried out for a time sufficient to result in a fluorine doping concentration which increases with distance from said surface which is in contact with the fluorine containing gas.

15. The method of claim 4, wherein in the centerline gas is flowed at a rate and the dopant step is carried out for a time and at a temperature which is sufficient to result in a flowing dopant concentration which is at a maximum in-between the inner and outer surfaces of the cylindrical soot preform.

16. The method of claim 15, wherein d=distance measured from the inner surface of the wall of the cylindrical soot preform to the point of highest fluorine content, T=the thickness of the wall of the cylindrical soot preform and d/t is greater than 0.2 and less than 0.8.

17. The method of claim 16, wherein the fluorine doping profile exhibits a generally parabolic shape.

18. The method of claim 11, wherein said forming a body step further comprises depositing a second core segment not having a refractive index increasing dopant.

19. The method of claim 1, wherein said body comprises at least a first core segment comprising a refractive index increasing dopant.

20. The method of claim 19, wherein said fluorine containing gas is an organic fluorine containing gas.

21. The method of claim 20, wherein said body further comprises a second core segment not having a refractive index increasing dopant.

22. The method of claim 21, wherein the body is deposited onto a mandrel, and the mandrel is removed to form a cylindrical soot body having a centerline hole therethrough.

23. The method of claim 22, wherein a gas is flowed down the centerline hole during the doping step.

24. The method of claim 23, wherein the gas flowed down the centerline hole is helium.

25. The method of claim 23, wherein the doping step is carried out for a time and at a temperature which is sufficient to result in a doping concentration which is at a maximum in-between the inner and outer surfaces of the cylindrical soot preform.

26. The method of claim 24, wherein d=distance measured from the inner surface of the wall of the cylindrical soot preform to the point of highest fluorine content, T=the thickness of the wall of the cylindrical soot preform and d/t is greater than 0.3 and less than 0.7.

27. The method of claim 26, wherein the fluorine doping profile exhibits a generally parabolic shape.

28. A method of making a fluorine-doped optical fiber preform comprising the steps of:

chemically reacting at least some of the constituents of a moving stream of gas mixture comprising at least one glass-forming precursor compound and an oxidizing medium, the reaction resulting in the formation of a glassy silica-based reaction product, forming a body by depositing at least a part of the reaction products on a substrate without changing the density thereof, and doping the body with fluorine by contacting the body with a fluorine containing gas for a time and at a temperature which is sufficient to result in a lowering of the fluorine content at or near a surface of said body which is in contact with the fluorine containing gas, relative to the fluorine content internal to said body.

29. A method of making a fluorine-doped optical fiber preform comprising the steps of:

chemically reacting at least some of the constituents of a moving stream of gas mixture comprising at least one glass-forming precursor compound and an oxidizing medium, the reaction resulting in the formation of a glassy silica-based reaction product, forming a body having a substantially constant density by depositing at least a part of the reaction products on a substrate, and doping the body with fluorine by contacting the body with a fluorine containing gas for a time and at a temperature which is sufficient to result in a lowering of the fluorine content at or near a surface of said body which is in contact with the fluorine containing gas, relative to the fluorine content internal to said body.

30. A method of making a fluorine-doped optical fiber preform comprising the steps of:

chemically reacting at least some of the constituents of a moving stream of gas mixture comprising at least one glass-forming precursor compound and an oxidizing medium, the reaction resulting in the formation of a glassy silica-based reaction product, forming a body by depositing at least a part of the reaction products onto a mandrel, removing the mandrel to form a cylindrical soot body having a centerline hole therethrough, inserting a second body, which is comprised of silica based glassy material, into said hole, and doping the body with fluorine by contacting the body with a fluorine containing gas for a time and at a temperature which is sufficient to result in a lowering of the fluorine content at or near a surface of said body which is in contact with the fluorine containing gas, relative to the fluorine content internal to said body.

31. The method of claim 30 wherein said fluorine containing gas is an organic fluorine containing gas or $SF_6$.

32. The method of claim 30 wherein said second body comprises a consolidated glass body.

33. The method of claim 32 wherein said second body comprises at least a first core segment comprising a refractive index increasing dopant.

34. The method of claim 33 wherein said refractive index increasing dopant is selected from the group consisting of $GeO_2$, $Al_2O_3$, $P_2O_5$, $TiO_2$ and $Ta_2O_5$.

35. The method of claim 33, wherein the fluorine containing gas is selected from the group consisting of $CF_4$, $C_2F_6$, and $C_3F_8$.

36. A method of making a fluorine-doped optical fiber preform comprising the steps of:

chemically reacting at least some of the constituents of a moving stream of gas mixture comprising at least one glass-forming precursor compound and an oxidizing medium, the reaction resulting in the formation of a glassy silica-based reaction product, forming a body by depositing at least a part of the reaction products on a substrate, wherein said body comprises a first core segment comprising a refractive index increasing dopant and a second core segment not having a refractive index increasing dopant, and doping the body with fluorine by contacting the body with a fluorine containing gas for a time and at a temperature which is sufficient to result in a lowering of the fluorine content at or near a surface of said body which is in contact with the fluorine containing gas, relative to the fluorine content internal to said body.

37. The method of claim 36 wherein said fluorine containing gas is an organic fluorine containing gas or $SF_6$.

38. The method of claim 36 wherein the body is deposited onto a mandrel, and the mandrel is removed to form a cylindrical soot body having a centerline hole therethrough.

39. The method of claim 38, wherein said method further comprises, subsequent to said doping step, inserting a second body which is comprised of silica based glassy material, into said hole.

40. The method of claim 39, wherein said second body comprises a consolidated glass body.

41. The method of claim 40, wherein said second body comprises at least a first core segment comprising a refractive index increasing dopant.

42. The method of claim 41, wherein said refractive index increasing dopant is selected from the group consisting of $GeO_2$, $Al_2O_3$, $P_2O_5$, $TiO_2$ and $Ta_2O_5$.

43. The method of claim 41, wherein the fluorine containing gas is selected from the group consisting of $CF_4$, $C_2F_6$, and $C_3F_8$.

44. The method of claim 38, wherein a gas is flowed down the centerline hole during the doping step.

45. The method of claim 44, wherein the gas flowed down the centerline hole is helium.

46. The method of claim 44, wherein the doping step is carried out for a time and at a temperature which is sufficient to result in a doping concentration which is at a maximum in-between the inner and outer surfaces of the cylindrical soot preform.

47. The method of claim 46, wherein d=distance measured from the inner surface of the wall of the cylindrical soot preform to the point of highest fluorine content, T=the thickness of the wall of the cylindrical soot preform and d/t is greater than 0.3 and less than 0.7.

48. The method of claim 46, wherein the fluorine doping profile exhibits a generally parabolic shape.

\* \* \* \* \*

UNITED STATES PATENT AND TRADEMARK OFFICE
CERTIFICATE OF CORRECTION

PATENT NO.     : 6,263,706 B1                                                Page 1 of 1
DATED          : July 24, 2001
INVENTOR(S)    : Deliso Evelyn M et al.

It is certified that error appears in the above-identified patent and that said Letters Patent is hereby corrected as shown below:

Column 8,
Line 49, "thickness of the wall of the cylindrical soot perform and d/t" should be
-- thickness of the wall of the cylindrical soot perform and d/T --

Column 9,
Line 11, "thickness of the wall of the cylindrical soot perform and d/t" should be
-- thickness of the wall of the cylindrical soot perform and d/T --

Column 10,
Line 62, "thickness of the wall of the cylindrical soot perform and d/t" should be
-- thickness of the wall of the cylindrical soot perform and d/T --

Signed and Sealed this

Sixteenth Day of September, 2003

JAMES E. ROGAN
*Director of the United States Patent and Trademark Office*